INVENTORS:
Henry Schwarzkopf
John G. Van Otterloo

United States Patent Office 2,815,746
Patented Dec. 10, 1957

2,815,746

CUT-OFF BLADES FOR ABRASIVE BODIES AND THEIR PRODUCTION

Henry Schwarzkopf, Pelham Manor, and John G. Van Otterloo, Pleasantville, N. Y., assignors to Consolidated Diamond Tool Corp., Yonkers, N. Y., a corporation of New York Application April 10, 1957, Serial No. 652,011

5 Claims. (Cl. 125—22)

This invention relates to cutting discs which have been found to be of great value in cutting concrete or other hard abrasive material or bodies. Successful cutting discs of this type consist of a strong, circular sheet-metal drive disc which has joined to its periphery a plurality of projecting cutting segments containing diamond dust held dispersed and embedded in a hard material consisting of a mixture of tungsten carbide and a binder metal of cobalt or nickel, or both of these metals. To suppress the excessive wearing action of the loosened abraded particles and damaging the junction region between the interior metallic drive disc and the projecting cutting segments, the latter have been provided with an eccentric irregularity at its radially inward junction edge, so that it is effective in radially displacing the loosened abrasive particles from the junction region of the drive disc, and thus minimizing its excessive wear. Notwithstanding the protective action of the eccentric irregularity of the inner junction edge of the cutting segments, the abrasiveness of the loosened abraded particles in some regions is so high that it is still causing a substantial amount of excessive wear along the junction region of the metallic drive disc.

Among the objects of the invention is a cutting disc of the foregoing type, having simple protective means for suppressing the abrading action of the loosened abrasive material along the peripheral junction region of the metallic drive disc of such cutting disc.

In accordance with the invention, the peripheral region of the cutting disc to which the individual cutting segments are joined, is provided with one or more elongated members, such as pin or rod-like members of hard, wear-resistant material, such as tungsten carbide or the like, extending in a generally inward direction from the periphery of the metallic drive disc for displacing from a substantial radial region thereof the abrading particles that have been loosened by the cutting action. In its simplest form, each or only some of the peripheral portions of the metallic drive disc underlying the respective cutting segments is provided with an inwardly extending hole of substantial radial depth, and a hard pin of tungsten carbide or like material of a thickness of the order of the thickness of the drive disc is driven or otherwise fixed within the inward disc hole so as to form a fixed part of the drive disc. Where the hard pins are somewhat thicker than the drive disc, they act to displace the loosened abrading material from the junction region of the supporting disc for a substantial radial depth thereof along the region adjoining the projecting cutting segments, thereby suppressing abrasion of the junction region of the metallic supporting disc. Where the hard pins are of smaller thickness than the metallic drive disc, their side edges will be exposed after a short period of use, and the exposed pins will act in the same manner as the similar hard pins which are of greater thickness than the metallic drive disc.

The pins or rod-like members may be round, square or polygonal in cross-section, but are formed to fit closely within the holes provided for them. As already stated, they are made of relatively hard and wear-resistant cemented materials, such as cemented tungsten carbide or cemented carbides of Ti, Ta, Zr, or Mo, or like hard carbides, or of cemented refractory borides of these metals, the refractory particles of which are bound by a lower-melting addition metal. These elongated inserts work very well by themselves to prevent abrasion on the juncture region of the metallic drive disc, and they are very effective when used in combination with the cutting segments having the eccentric inner surfaces.

In practice, very good results are obtained with cutting wheels formed of a circular metal disc with an annular array of cutting segments of the invention having a thickness of about 1/16" to 3/16" and a radius of about 3/8" to 1/2" which are secured with their inner edges by brazing to the edge of the metal disc which is slightly thinner in thickness than the cutting segments. The same disc with the same cutting segments is fully effective for cutting all kinds of hard abrasive materials irrespective of their hardness, including bodies of cemented silicon carbide, porcelain, marble, alumina glass, as well as the less hard tiles, slate, limestone, bricks, and also such softer materials as terra cotta, magnesite bricks, and plastics. The powder mixture from which the cutting segments of the invention are made, consists of 30%–70% tungsten carbide, and the balance cobalt and/or nickel to which is added 2% to 6.5% of diamond dust. A very satisfactory composition consists of 40% tungsten carbide, 60% cobalt, to which is added 2% to 6.5% diamond dust. The composition is hot-pressed in a suitable hot-pressing die such as a graphite die.

Diamonds of 20–40 mesh size, for example, embedded in a matrix which is substantially a tungsten carbide-cobalt or tungsten carbide-nickel matrix (containing 30%–70% of tungsten carbide and the remainder cobalt and/or nickel) provides a cutting segment which is suitable and durable for cutting any of the various hard materials mentioned above.

Especially in the grinding of green concrete it has been found that there is a tendency for the steel disc core to wear away at or adjacent the region where the steel of the disc and the cutting segment are united. Thus, eventually the cutting segment separates from the core disc due to the reduced area of contact between the united surfaces. This abrasive wearing away of the steel core disc at the area adjacent the cutting segment is prevented if the inside surface of the cutting disc is not concentric with the cutting surface of the segment. In practice, it has been found very satisfactory to make the inside of the segment with a straight or convex edge instead of with the usual concentrically concave surface.

The foregoing and other objects of the invention will be best understood from the following description of specific exemplifications thereof, reference being had to the accompanying drawing, wherein.

Figure 1:
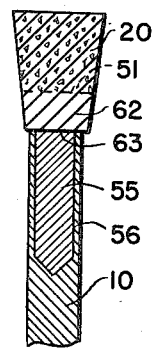
Fig. 1 is a cross-sectional view of a cutting disc made according to the invention, taken on line 1—1 of Fig. 2.
Figure 2:
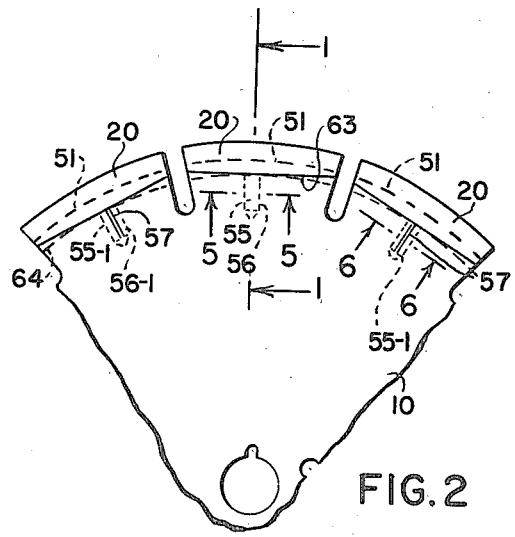
Fig. 2 is a partial plan view of a cutting disc made according to the invention.

Figs. 1 and 2 show a finished grinding wheel or disc of the invention, which comprises the central disc 10 of strong metal, such as steel, to which are attached a plurality of grinding or cutting segments 20 made according to the invention. The central metal disc 10 is somewhat narrower than the segments 20 (Fig. 1). The central metal disc 10 is of conventional design. In such discs, the grinding segments 20 overhang the metal disc 10 on the order of about 1/32″ on each side, or in other words, the segment is about 1/16″ thicker than the metal disc. As an example, in a cutter where the drive disc 10 has a thickness of about 3/32″ (which is a practical value for the drive disc), a very satisfactory thickness for the segments is 5/32″.

The cutting segments of the abrasive cutting wheels of the type described above are formed by hot-pressing an intimate powder mixture containing 35% to 65% of tungsten carbide, and about 65% to 35% of cobalt and/or nickel, the mixture also containing diamond dust which forms 2% to 6.5% of the total ingredients of the composition. (Throughout the specification and claims all proportions are given in weight, unless otherwise specifically stated.)

The cutting segment is formed in the hot-pressing die in such a way that its inner edge region which is united, as by brazing, to the periphery of the cutting disc has a segment section which is free of diamond dust so that it may be ground to a close fit against the steel disc and simplify the problem of forming a strong junction between them.

By way of example, a highly effective cutting segment of the invention may be produced as follows:

There is prepared a bottom layer mixture consisting of an intimate mixture of 40% of powdered tungsten carbide (WC) and 60% of powdered cobalt. There is also prepared the main body mixture consisting of a similar intimate mixture of 40% of powdered tungsten carbide (WC) and 60% of powdered cobalt to which is admixed diamond dust at the rate of 32 carats (6.4 grams) of diamond dust per 1 cubic inch, or 0.1165 gram diamond dust per 3.6 grams of the mixture of tungsten carbide and cobalt powder. Into the bottom region of the die cavity of a graphite die there is first deposited on the upwardly facing convex cavity surface 35-1 a bottom layer consisting of a mixture of powdered tungsten carbide and powdered cobalt which is free of any diamond dust, to provide a layer thickness of about 1/16″. Thereafter, there is deposited over the bottom layer mixture the main body powder mixture containing the proper proportion of diamond dust to the greater radial height desired for the cutting part of the cutting segment 20. The combined powder mixtures are then hot-pressed in the graphite die with a pressure of 1/2 to 2 tons per square inch, while heating it to a temperature of 1450° C. to 1500° C. for about 1/2 to 1 minute.

Cutting discs of the invention of the type described above have a life at least three times longer than that of prior art cutting discs. In the course of the much longer useful life of the cutting wheels of the invention, difficulties have been encountered, particularly in applications such as cutting of green or uncured concrete, with the metallic support or drive disc being worn out at the region of its circular junction edge to inner edge regions of the diamond-containing cutting segments. This wear is caused by the abrasive action of loose abrading particles on the rotating circular junction edge region of the metallic drive disc which sharpens and thins the drive disc at the critical circular junction periphery to which the cutting segments are brazed. This sharpening and thinning of the metallic periphery of the drive disc weakens the brazing junction to such an extent as to cause premature breaking off of the cutting segments from the drive disc. This difficulty has heretofore made it impossible to operate cutting discs of the dimensions described above for cutting of green concrete for more than a maximum cut of 1250 feet of concrete.

The just-described difficulties are overcome to a very material extent by forming the inner junction edge between the cutting segments and the drive disc with at least one eccentric edge irregularity so that rotation of the cutting wheel causes the eccentric inner edge irregularity of at least one cutting segment to radially displace the accumulated loose abrasive particles away from the main junction region between the cutting and the drive disc. The eccentric irregularities of the inner junction region of the cutting segment to the drive disc may be provided, for instance, by making the inner junction edge of the cutting segments in the form of several straight chord or straight edge portions which are joined to a correspondingly shaped edge segment of the drive disc. Alternatively, the inner junction edge of the cutting segment may be given the shape of a straight or plane surface edge. As a further alternative, the inner junction edge of the cutting disc is given a radially inward convex shape.

Figs. 1 and 2 show one form of a cutting wheel of the invention having cutting segments provided with an eccentrically irregular junction edge along which it is joined to the drive disc. The inner edge region 62 of each abrading segment 20, which is free of diamond dust, is provided with a radially eccentric junction surface 63 along which it is joined to the correspondingly shaped junction edge of the cutting segment 10. The eccentrically irregular inner edge region 62 of each cutting segment 20 is formed by a straight chord or edge 63 which is perpendicular to the center radius of each segment, thus providing a simple junction connection between each cutting segment 20 and the facing edge of the drive disc 10. Rotation of abrading segments 20 having straight edge junctions 63 to the drive disc 10 will cause the loose refractory particles accumulating below the junction edge 63 of the individual abrading segments 20 to be radially displaced by the eccentrically irregular segment edge 63 towards a region shown bounded on its radially outward side by the dash-line circle 64. As a result, the metallic drive disc 31 will be subjected to much less wear along its peripheral outer edge region, thus perserving for a materially longer period of useful life the main brazed edge region of the drive disc 10 along which it is joined to its individual abrading segments 20.

The eccentricity of the inner edge 63 is of material effect in removing or displacing a considerable amount of the loose abrasive particles which grind into the junction region between the cutting segments and the metallic drive disc, but the wear on this critical region is still excessive compared to the wear on the other parts of the grinding disc. According to the invention, the life of cutting discs described just above, is multiplied by at least two, and the wear along the peripheral junction region of the metallic drive disc is cut down to a small fraction of what it has been heretofore, by provided the periphery of the metallic drive disc with one or more elongated rod-like members of hard, tough, wear-resistant material, such as tungsten carbide, which extend inwardly from their peripheral junction region, in such a way that when the cutting disc rotates, the lateral portions of the deflecting rods tend to intercept the ground-away loose particles and suppress their grinding action on the peripheral region of the metallic drive disc. The deflecting rods should be made of the toughest cemented carbide material. Very good results are obtained by making the deflecting rods of the known toughest grade of cemented tungsten carbide, consisting of 88% to 92% tungsten carbide and 12% to 8% of cobalt, although nickel or a mixture of cobalt and nickel may be used instead of cobalt.

Figure 5:
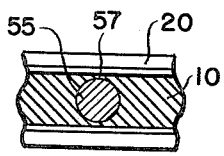
Fig. 5 is an enlarged cross-sectional view taken on line 5—5 of Fig. 2.
Figure 6:
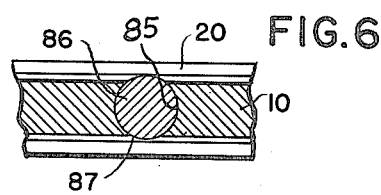
Fig. 6 is an enlarged cross-sectional view taken on line 6—6 of Fig. 2.

The deflecting rods of tungsten carbide are suitably secured in their radially inward position along the periphery of the metallic drive disc. In practice, very good results are obtained by drilling into the narrow metallic periphery of the metallic drive disc, radially extending holes and driving the tungsten carbide pins into the radial disc holes, which have such thickness as to assure that they are held with a very tight force-fit within the radial holes of the metallic drive disc. Thus, as shown in Fig. 5, each segmental region of the metallic periphery of the drive disc 10 adjoining a cutting segment 51, is provided with a radial hole 55 into which is driven the tungsten carbide deflecting rods or pins 56. The deflecting rods 56 have a thickness such as to enter the holes 56 with a force-fit, and that they shall remain fixed therein after the peripheral region of the metallic drive disc has worn off, so as to expose the opposite side edges 57 of the deflector pins 56 on the opposite sides of the drive disc 10. In other words, after the cutting disc has been used for a short time for grinding abrasive material, the peripheral region of the metallic drive disc will be worn away so as to expose the side edges 57 of the tungsten carbide deflecting rods or pins 56, which thereupon continue to function as deflecting members which suppress further wear of the peripheral region of the metallic drive disc by deflecting away, scouring and preventing continuous grinding action of loose abrasive particles along the periphery of the metallic drive disc. Very good results have been obtained with deflecting rods which are about ⅝" long. In general, good results are obtained with deflecting rods which extend inwardly about twice the radial height of the cutting segments 51. Instead of making the tungsten carbide deflector pin of smaller thickness, in the manner shown in Fig. 5, somewhat thicker deflector pins 86 may be used so that when they are driven in into the radial holes of the metallic drive disc, their side edges already project beyond the side edges of the metallic drive disc 10. Thus, as shown in Fig. 6, the metallic drive disc 10 may be provided with somewhat larger holes 85, into which are driven deflector pins or rods 86 of somewhat greater thickness than the thickness of the metallic drive disc 10, so that the side edges 87 of the deflector pins project beyond the side surfaces of the metallic drive disc 10.

Figure 3:
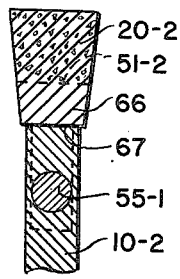
Figs. 3 and 4 are views similar to Figs. 1 and 2, respectively, but of a modified form of the invention.
Figure 4:
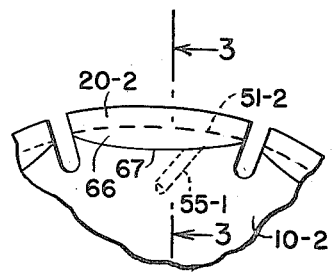

Figs. 3 and 4 show a modified form of grinding wheel of the invention wherein the diamond-containing abrading segments 20-2 are joined to the metallic drive disc 10-2 by an eccentrically irregular inner junction edge region 66. In the abrading wheel of Figs. 3 and 4, the individual abrading segments 20-2 have an eccentrically shaped inward junction edge region 66 provided with a junction surface 67 which is convex in a radially inward direction along which it is joined to the corresponding junction edge surface of the inner drive disc 10-2 of steel or like other similar metal. As in the case of the wheel of Figs. 1 and 2, rotation of the wheel shown in Figs. 3 and 4 will cause the eccentrically irregular inner junction edge 67 of its cutting segments 20-2 to displace loose abrasive particles in radially inward direction, thereby prolonging the useful life of the wheel and reducing in a very material way the abrading action of the loose abrasive particles on the junction region of the metallic drive disc 10-2, adjoining its cutting segments 20-2.

The metallic drive disc 10-2 of Figs. 3 and 4 is likewise provided with inwardly extending deflector pins 55-1 of tough carbide material such as tungsten carbide. Instead of having the carbide deflector pins extend in a strictly radial direction, in the manner shown in Figs. 1 and 2, the deflector pins may be held in the metallic drive disc in a position inclined relatively to the strictly radial direction. Thus, the metallic drive disc 10-2 has its deflector pins 55-1 held fixed therein so that they extend from the periphery under an angle relatively to the strictly radial direction of the drive disc 10-2. Such arrangement is of advantage, particularly when the cutting disc is operated in such a way that it rotates only in one direction, for instance, in clockwise direction, in the case of Figs. 3 and 4, so that in rotation, the inclined position of the deflector rods 55-1 acts as a scoop that deflects the loosened abrasive particles away from the peripheral region of the metallic drive disc 10-2. The cutting wheel of Figs. 3 and 4, is arranged and operates otherwise in the same manner as described in connection with the cutting disc of Figs. 1 and 2.

It will be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described herein.

We claim:

1. In a cutting disc for cutting hard abrasive material having a strong inner drive disc of sheet metal and arcuately cutting segments having inner edge surfaces united to successive peripheral edge regions of said disc, each segment being at most about ¼" thick, and having a main radially extending cutting segment consisting of a proportion of diamond dust held dispersed and bonded in a hard cemented carbide material, said inner drive disc being of smaller thickness than said cutting segments and containing at least one elongated deflecting member of hard, abrasion-resistant carbide material extending from the peripheral region of said drive disc where the latter is joined to the segments in a generally inward direction, the thickness of said elongated deflecting member being of the order of thickness of said inner drive disc.

2. In a cutting disc as claimed in claim 1, the cemented carbide material of said segments consisting of 35% to 55% of tungsten carbide and the balance consisting essentially of a metal selected from the group consisting of cobalt, nickel, and mixtures of cobalt and nickel, at least two peripheral regions of said drive disc adjoining said cutting segments having said inwardly extending elongated deflecting members, and each of said deflecting members being formed of cemented tungsten carbide.

3. In a cutting disc as claimed in claim 2, said deflecting members consisting of 88% to 92% of tungsten carbide and the balance consisting essentially of a binder metal selected from the group consisting of cobalt, nickel, and a mixture of cobalt and nickel.

4. In a cutting disc as claimed in claim 1, the cemented carbide material of said segments consisting of 35% to 55% of tungsten carbide and the balance consisting essentially of a metal selected from the group consisting of cobalt, nickel, and mixtures of cobalt and nickel, each peripheral region of said drive disc adjoining said cutting segments having said inwardly extending elongated deflecting members, and each of said deflecting members being formed of cemented tungsten carbide.

5. In a cutting disc as claimed in claim 1, the cemented carbide material of said segments consisting of 35% to 55% of tungsten carbide and the balance consisting essentially of a metal selected from the group consisting of cobalt, nickel, and mixtures of cobalt and nickel, each peripheral region of said drive disc adjoining said cutting segments having said inwardly extending elongated deflecting members, and each of said deflecting members being formed of cemented tungsten carbide, each of said cutting segments having at least one eccentric region with an increased dimension in a radially inward direction, whereby said eccentric region causes loose abrasive particles to be radially displaced from the peripheral junction region of said drive disc adjoining the cutting segments.

No references cited.